Dec. 5, 1933.  G. W. JANSON  1,937,894
TIME SERVICE SYNCHRONIZING SYSTEM
Filed Nov. 8, 1930  9 Sheets-Sheet 1

Inventor
George W. Janson
Eugene C. Brown
Attorney

Dec. 5, 1933.  G. W. JANSON  1,937,894
TIME SERVICE SYNCHRONIZING SYSTEM
Filed Nov. 8, 1930   9 Sheets-Sheet 3

Inventor
George W. Janson
Eugene C. Brown
Attorney

Dec. 5, 1933.  G. W. JANSON  1,937,894
TIME SERVICE SYNCHRONIZING SYSTEM
Filed Nov. 8, 1930   9 Sheets-Sheet 4

Inventor
George W. Janson
Eugene C. Brown
Attorney

Dec. 5, 1933.　　　G. W. JANSON　　　1,937,894
TIME SERVICE SYNCHRONIZING SYSTEM
Filed Nov. 8, 1930　　　9 Sheets-Sheet 5
Fig. 4.ª
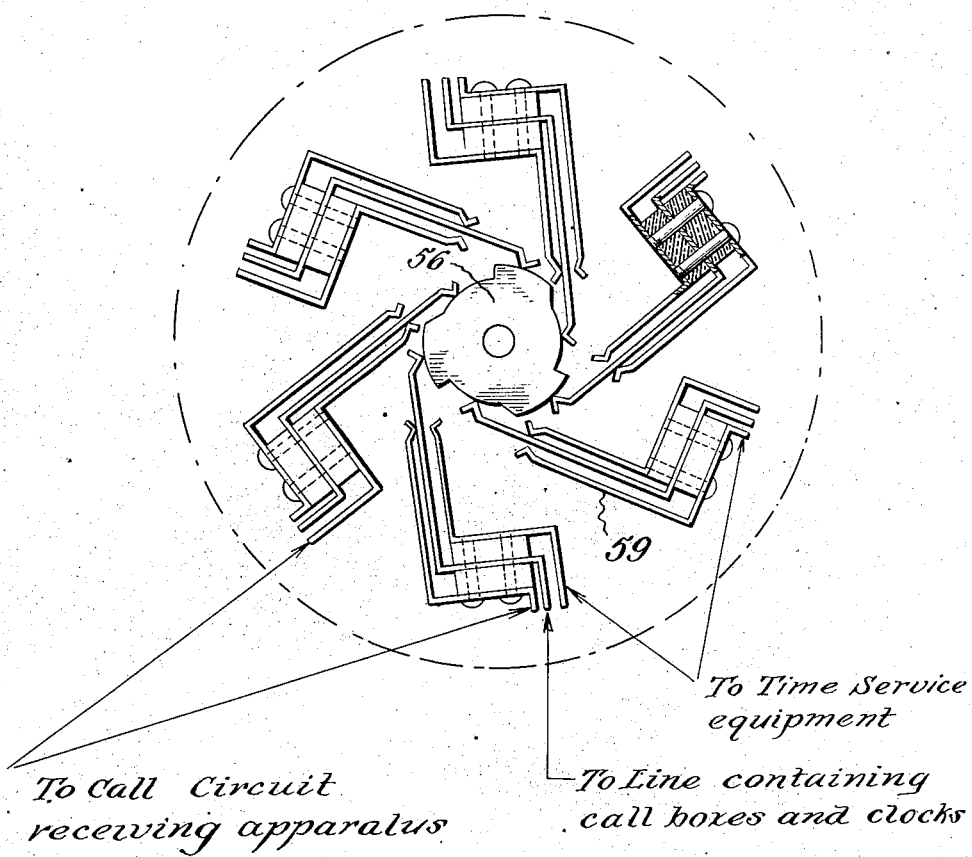
To Time Service equipment
To Call Circuit receiving apparatus
To Line containing call boxes and clocks
Inventor
George W. Janson
Eugene E. Brown
Attorney Dec. 5, 1933.   G. W. JANSON   1,937,894
TIME SERVICE SYNCHRONIZING SYSTEM
Filed Nov. 8, 1930   9 Sheets-Sheet 6
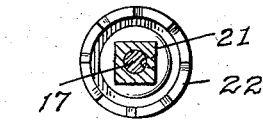
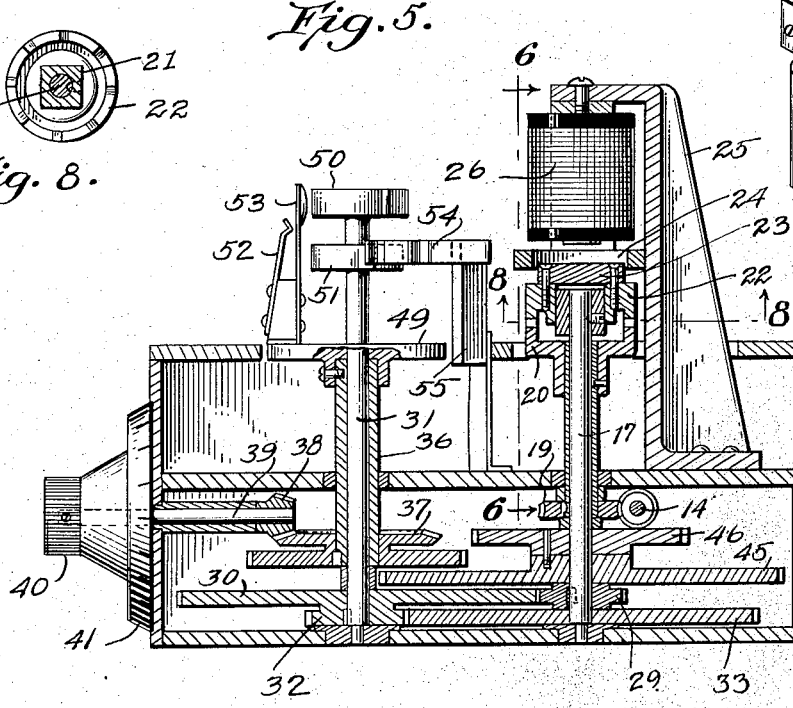
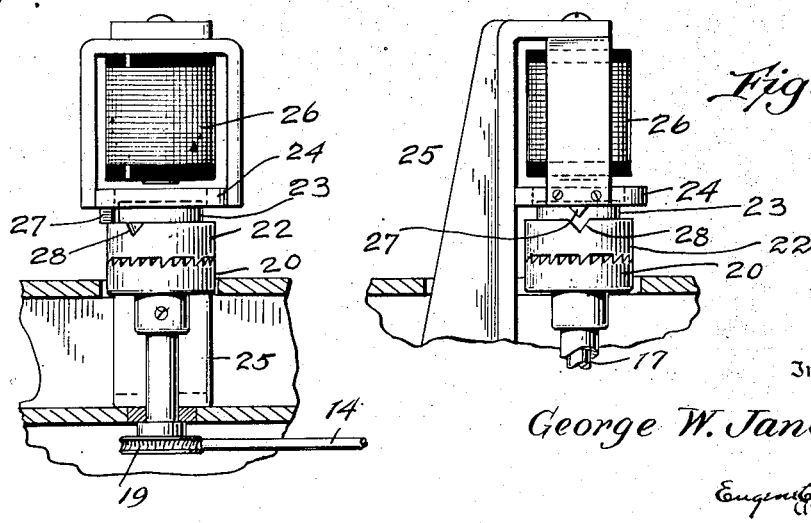

Dec. 5, 1933.     G. W. JANSON     1,937,894
TIME SERVICE SYNCHRONIZING SYSTEM
Filed Nov. 8, 1930     9 Sheets-Sheet 7

Inventor
George W. Janson
Eugene C. Brown
Attorney

Dec. 5, 1933.    G. W. JANSON    1,937,894
TIME SERVICE SYNCHRONIZING SYSTEM
Filed Nov. 8, 1930    9 Sheets-Sheet 8

Inventor
George W. Janson
Eugene E. Brown
Attorney

Patented Dec. 5, 1933

1,937,894

UNITED STATES PATENT OFFICE 1,937,894

TIME SERVICE SYNCHRONIZING SYSTEM

George W. Janson, Nutley, N. J., assignor to The Western Union Telegraph Company, New York, N. Y., a corporation of New York Application November 8, 1930. Serial No. 494,425

6 Claims. (Cl. 58—35)

This invention relates to electric clock systems wherein a master clock controls the operation of a number of subscribers' clocks and wherein each subscriber's clock having any variation from synchronism with the master clock is corrected at predetermined time intervals, in the present case at intervals of one hour, by synchronizing impulses transmitted under control of the master clock.

In devices of this character it is desirable that as little work as possible shall be imposed on the master clock in addition to its time keeping function and that the operation of the circuit closers necessary for closing the synchronizing circuits through the subscribers' clocks shall be effected by separate motor means. It is necessary for a relatively high voltage to be used in the subscribers' circuits but it is not desirable that the mechanism of the master clock shall be used for directly closing and opening any but very low tension circuits. A normally idle electric motor is found desirable to actuate the circuit closers for the subscribers' clock circuits and, in order to have this motor operate at uniform speed and in synchronism with the master clock it is desirable to provide that the motor shall not actuate these circuit closers until sufficient time has elapsed after the motor starts to permit it to acquire its normal speed.

Since all clock mechanisms are subject to variation from standard time it sometimes happens, in a system of this character, that the master clock will vary from standard time. In the present instance such standard time is assumed to be that of the Naval Observatory at Washington, D. C. from which time signals are transmitted telegraphically at noon each day. It is accordingly desirable that means shall be provided for checking the master clock of such a system against the Washington time signals and for adjusting certain of the contacts of the subscribers' circuits to correct any error in synchronism between the subscribers' clocks and standard time, while temporarily leaving the master clock in a synchronous condition.

It is also desirable, in a system of this character that means should be provided for testing the several subscribers' circuits without interfering with the operation of the synchronizing means.

The main objects of the present invention are accordingly to provide an efficient apparatus for synchronizing a number of subscribers' clocks with a master clock by synchronizing impulses transmitted to the subscribers' clocks at predetermined time intervals; to eliminate to the greatest practicable extent all duty from the master clock other than its duty as a time keeper; to effect the operations of closing and opening the synchronizing circuits by an electric motor; to provide means whereby the motor will normally remain idle and out of circuit but will be connected in a motor circuit and allowed to run idle until it has acquired its standard speed and thereafter connecting it to the circuit closing means for the synchronizing circuits; to provide means for checking and correcting errors due to variation of the master clock from standard time; and to provide means for testing the several subscribers' circuits.

With the above and other objects in view certain embodiments of the invention will now be described in detail and specifically claimed, reference being had to the accompanying drawings, wherein:—

Figure 4ª is a modified arrangement of the clock circuit closers shown in Fig. 4.

Figure 5 is a section on the line 5—5 of Figure 2, parts behind the section being omitted.

Figure 6 is a section on the line 6—6 of Figure 5.

Figure 7 is a view of certain parts of Figure 6 taken from the left of that figure and showing the parts at the instant the motor drive becomes effective.

Figure 8 is a section on the line 8—8 of Figure 5.

Figure 9 is a perspective view of the upper part of a certain drive shaft used herewith.

Figure 1:
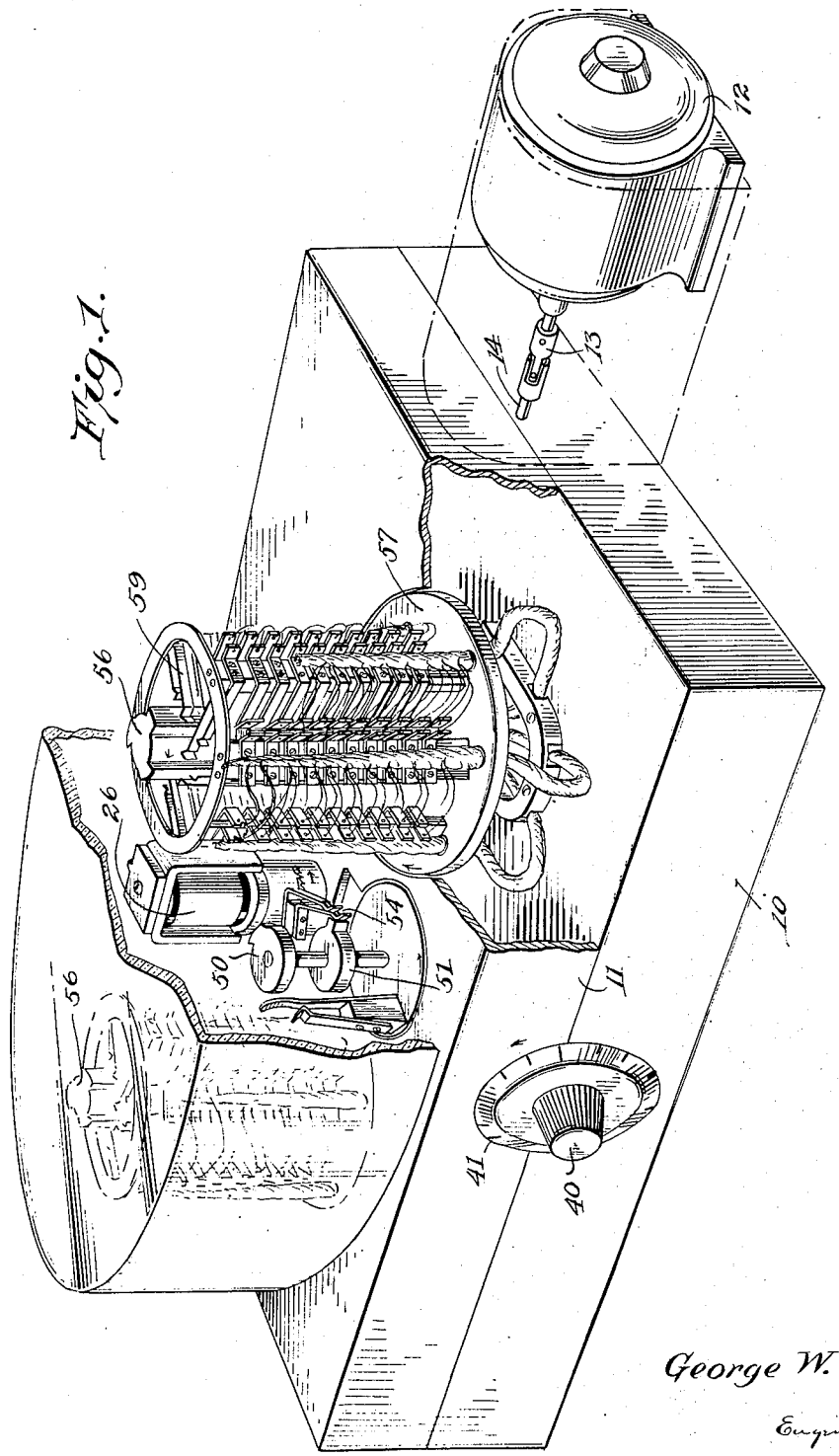
Figure 1 is a perspective view of one form of the apparatus, certain parts of the casing being broken away to show parts of the apparatus.
Figure 2:
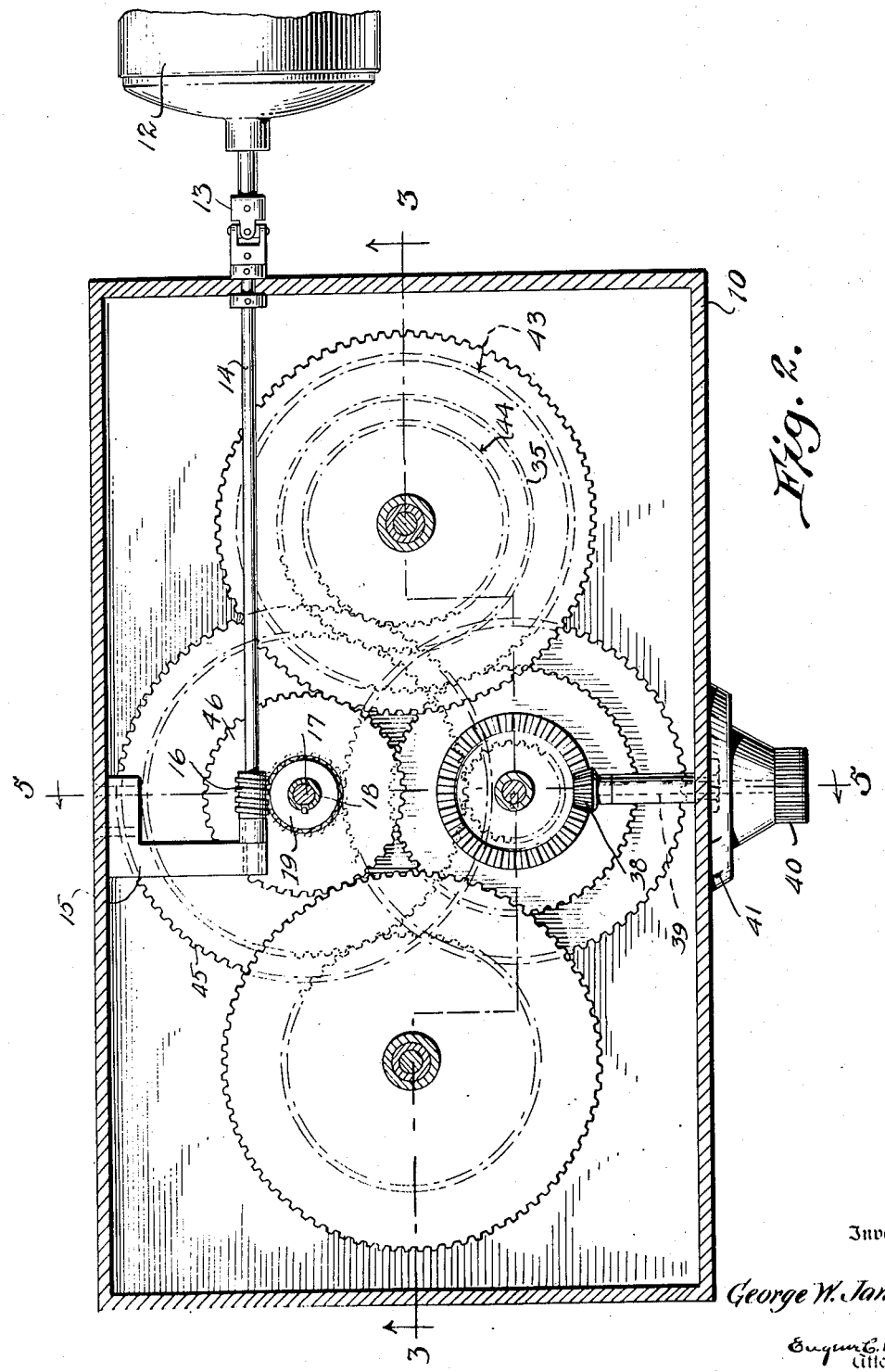
Figure 2 is a plan view of the gearing in the lower part of the casing in this form of the apparatus.
Figure 3:
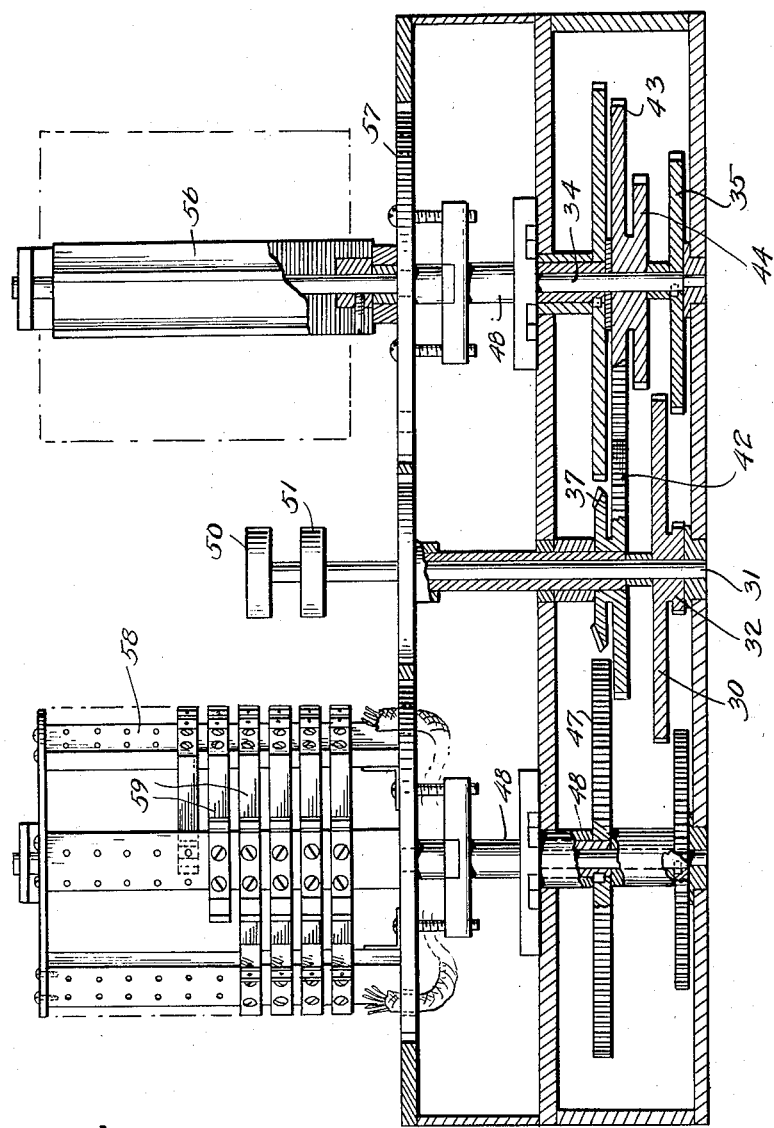
Figure 3 is a view in section on the line 3—3 of Figure 2, certain of the parts being shown in elevation and others to the rear being omitted.

In the form of the invention shown in Figures 1 to 10 inclusive there is provided a casing having a lower section 10 and an upper section 11. A motor 12 is provided which is here shown as exterior of the casing, the motor shaft being connected by a universal coupling 13 with a drive shaft 14, which extends into the casing section 10 and has its inner end journalled in a bearing 15. A worm 16 is keyed or otherwise fixed on the shaft 14 adjacent the bearing 15. At 17 is a vertical shaft whereon is rotatably mounted a sleeve 18 which is provided at its lower end with a worm wheel 19, wherewith the worm 16 meshes. A lower clutch member 20 is fixed on the upper end of the sleeve to revolve therewith. A rectangular head 21 is fixed on the upper end of the shaft 17 and an upper clutch member 22 has a central opening fitting this head to slide vertically thereon. An armature 23 is secured to the upper face of the clutch member 22 and slides through a guide ring 24 which is supported on a bracket 25 and an electromagnet 26 is supported by this bracket so that, when energized, this magnet raises the clutch member 22, opening the clutch and when deenergized allows the member 22 to fall, closing the clutch, so that the shaft 17 and sleeve 18 will revolve together. A wedge lug 27 (see Fig. 7) is formed on the under side of the ring and is adapted to enter a V-notch 28 in the upper face of the member 22 upon the clutch being opened, thus causing the shaft 17 to be held at rest always in the same position, it being understood that the arrangement of the motor and its connections and circuit closers is such that the shaft 17 will always stop in such position that the wedge 27 will always enter the notch 28 upon energization of magnet 26, so that any slight variation from true starting position of shaft 17 will thus be automatically corrected. The reason for the necessity of this will be apparent by what follows hereinafter. A pinion 29 is fixed on the lower part of shaft 17 and meshes with a gear 30 fixed on a vertical shaft 31 and having a pinion 32 formed integrally therewith. A gear 33 is revolubly mounted on the shaft 17 and is in mesh with the pinion 32. At each side of the apparatus is a vertical shaft 34 on the lower end of which is fixed a gear 35 wherewith the gear 33 meshes. This train thus forms a reduction gear for driving the shafts 34 upon rotation of the shaft 17.

A sleeve 36 is revolubly mounted on the shaft 31 and keyed on this sleeve is a bevel gear 37 wherewith meshes a bevel pinion 38 carried on the inner end of a horizontal shaft 39 which projects forwardly through the front of the casing section 10. A manipulating knob 40 bearing a radially divided dial 41 is fixed on the outer end of shaft 39 to rotate the same. A gear 42 is formed integrally with the gear 37 and meshes with a gear 43 revolubly mounted on one of the shafts 34 and having a gear 44 formed integrally therewith. A gear 45 is revolubly mounted on the shaft 17 and is in mesh with the gear 44. A gear 46 is fixed to the gear 45 and meshes with gears 47 fixed on sleeves 48 which are revolubly mounted on respective shafts 34 thereby providing a reduction train between sleeve 36 and sleeves 48.

A disk 49 is fixed on the upper end of the sleeve 36 and revolves in a suitable opening in the top of the casing 11. A pair of contact closing cams 50 and 51 are spaced one below the other on the upper end of the shaft 31, this upper end projecting well above the disk 49. A fixed contact member 52 and a movable contact member 53 project up from the disk 49, the member 53 lying in the path of the upper cam 50. A second pair of contact fingers 54 are supported on a bracket 55 fixed to the casing and lie in the path of the lower cam 51.

An elongated and fluted contact closing cam 56 is fixed on the upper end of each shaft 34 to revolve therewith. A disk 57 is fixed on the upper end of each sleeve 48 and supports a contact supporting frame having a series of vertical bars 58 each carrying a series of pairs of contact fingers 59, the arrangement of the parts being such that rotation of the cam 56 causes simultaneous closing of all contacts 59.

Figure 10:
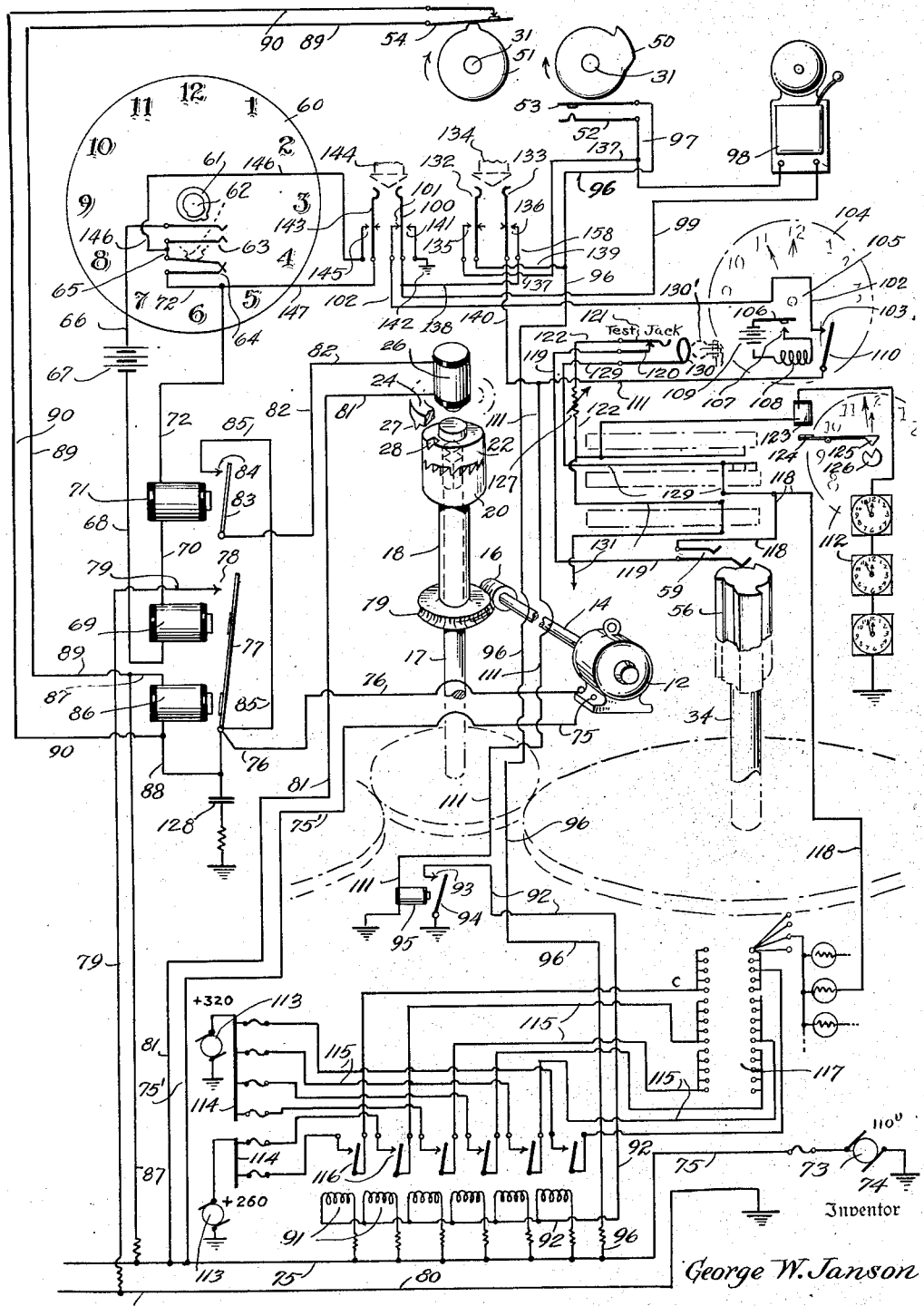
Figure 10 is a diagrammatic view of the circuits used in this form.

Considering now the circuit connections for this form of the invention as shown in Fig. 10, there is provided a master clock 60 having circuit closing cams 61 and 62 fixed on a suitable staff of the clock work mechanism, being preferably fixed on the minute staff which makes one complete revolution every hour. A spring contact circuit closer 63 is positioned in the path of the cam 61 and the arrangement of this cam and contact is such that the contacts are closed ten seconds before the hour and held closed for eight seconds. A second pair of spring fingers forming a circuit closer 64 is arranged in the path of the cam 62 and the arrangement of this cam and circuit closer is such that the contact is closed at twenty seconds before the hour and held closed for twenty seconds to open at the hour. A conductor 65 connects the circuit closers 63 and 64 in series and a conductor 66 leads from the circuit closer 63 to one terminal of a local battery 67. A conductor 68 leads from the remaining terminal of this battery to one terminal of the closing magnet 69 of a motor circuit relay. A conductor 70 leads from magnet 69 to the magnet 71 of a lifting magnet circuit relay and a conductor 72 connects this magnet 71 with the circuit closer 64. A suitable source of current for the motor here indicated by the generator 73 is provided, one terminal of the generator being grounded at 74 and a conductor leads from the generator 73 to the motor 12. A conductor 76 leads from motor 12 to the movable contact 77 of the motor circuit relay, a contact 78 being engaged by this contact upon energization of magnet 69. A conductor 79 connects the contact 78 with a ground wire 80. Also a conductor 81 leads from the conductor 75 to one terminal of magnet 26, the other terminal of said magnet being connected to a conductor 82 which leads to the movable contact 83 of the magnet circuit relay. A contact 84 is engaged by this contact 83 upon energization of magnet 71 and is connected by a conductor 85 to contact 77. A holding magnet 86 is connected by a conductor 87 to the feed wire 75 and a conductor 88 connects this holding magnet to the contact 77. A conductor 89 connects conductor 87 to one side of short circuiting circuit closer 54 and a conductor 90 connects the other side of this circuit closer to conductor 88. The circuits just described effect closing and opening of the motor and lifting magnet circuits in timed relation as follows: At twenty seconds before the hour circuit closer 64 is closed and at ten seconds before the hour circuit closer 63 is closed, the cams 61 and 62 respectively effecting such closing. Current will now flow from battery 67 through conductor 66, circuit closer 63, conductor 65, circuit closer 64, conductor 72, magnet 71, conductor 70, magnet 69, and conductor 68 to battery 67. This will close contacts 77 and 83 on contacts 78 and 84 respectively. Consequently current will flow from source 73 through conductor 75, conductor 75', motor 12, conductor 76, contact 77, contact 78, conductor 79 to ground wire 80. Current will also flow from conductor 75 through conductor 81, magnet 26, conductor 82, contact 83, contact 84, and conductor 85 to contact 77 and thus to the ground as before. Furthermore current will flow from feed 75 through conductor 87, magnet 86 and conductor 88 to contact 77 and again to the ground so that the holding magnet 86 is energized. The magnet 26 being thus energized the clutch member 22 is raised so that the sleeve 18 is free to revolve on shaft 17. This also starts motor 12 which is allowed time to attain its rated speed. At two seconds before the hour the cam 61 releases the circuit closer 63, opening the circuit through the magnets 69 and 71. This permits contact 83 to open and thus deenergize the magnet 26 which allows clutch member 22 to drop and engage clutch member 20 and thus cause shaft 17 to revolve with sleeve 18 since the holding magnet 86 is not at this time deenergized and the motor circuit is maintained. As the shaft 17 revolves the shaft 31 will be driven by the reduction gear as will also the shafts 34.

A number of relay windings 91 are connected in multiple to the supply 75 and to a conductor 92 which leads to the fixed contact 93 of a relay having a movable contact 94 and an actuating magnet 95, one terminal of which is grounded, as is also the contact 94. A conductor 96 connects supply conductor 75 with contact 53 and a conductor 97 connects contact 52 with a bell 98. A conductor 99 leads from this bell to a contact of a testing jack. A contact 101 is normally engaged by the contact 100 and is connected by a conductor 102 with the fixed contact 103 of a battery clock relay 108. This relay is controlled by a battery clock 104, actuating a circuit closing cam 105 at five seconds before the hour to engage a movable contact 106 and close it on a fixed contact 107 connected through the relay winding 108 to a battery 109 which is also connected to contact 106. A movable armature contact 110 is moved by the energization of the relay winding 108 to engage the contact 103, the contact 110 being connected by a conductor 111 with magnet 95. As above noted, the contact 110 is closed on the contact 103 at five seconds before the hour. The cam 50 is timed to close the contact 53 on the contact 52 two seconds after the sleeve 18 is clutched to the shaft 17 being thus exactly on the hour as given by the master clock provided the latter is in correct time, provision being made as will be hereinafter described for effecting closing of contacts 53 and 52 exactly on the true hour. Current will now flow from supply 75 through conductor 96, contact 53, contact 52, conductor 97, bell 98, conductor 99, contact 100, contact 101, conductor 102, contact 103, contact 110, conductor 111 and magnet 95 to the ground. This will effect closing of contact 94 on contact 93 and current will flow from supply 75 through relay windings 91, conductor 92, contact 93 and contact 94 to the ground. It will be noted that an audible signal is given by the bell upon closing of contacts 53 and 52. It will be noted that the high voltage generators 113 are connected to the panel 117 containing the terminals of the clock circuits, only five seconds before the hour under the control of the battery clock. All of the high voltage circuits and controlling relays should be isolated entirely from the master clock and its circuits and hence this high voltage apparatus is placed in a different location and is under the control of a separate battery clock.

The subscribers' clocks 112 are connected in series in each of a number of circuits, the setting mechanism for only one of these clocks being here shown. Because of the variation in lengths and resistances of the different circuits it is preferred to provide power sources 113 of different voltages each feeding to a separate bus bar 114 from whence individual circuit conductors 115 lead through circuit closers 116, controlled by the respective windings 91, to a distributing panel 117 from whence run the conductors of the individual clock circuits one of which is shown at 118. The conductor 118 leads to one of the circuit closers 59 and a conductor 119 leads from this circuit closer 59 to a test jack contact 120 on which is normally closed a contact 121. A conductor 122 connects this contact 121 in series through the clock setting magnets 123 of the subscribers' clocks 112 and has its terminal end grounded. The magnet 123 in each clock is arranged to actuate a lever 124 when energized and this lever carries a wedge 125 which engages a V-shaped setting groove in a disk 126 fixed on the minute staff of the respective clock 112 so that if the minute hand of the clock is not in its true position it is moved by this means to position on the sixty minute mark. Tracing this circuit it will be seen that, upon closing the contact 94 on contact 93 and consequent energization of coils 91 as before described, current will flow from source 113 through bar 114, conductor 115 and circuit closers 116 to connecting panel 117 and from thence through conductor 118, circuit closer 59, conductor 119, contact 120, contact 121, conductor 122 and magnet 123 to the ground. A variable resistance 127 is preferably inserted in conductor 122 so that the several clock circuits may be balanced. Also a suitable spark preventing device 128 may be connected to the motor circuit.

The cam 51 is arranged to close the circuit closer 54 temporarily at two seconds after the hour. Closing of the circuit closer 54 effects short circuiting of the current through the holding magnet 86 since current will now flow from feed 75 through motor 12, conductor 76, conductor 88, conductor 90, circuit closer 54, conductor 89 and conductor 87 to ground wire 80. The contact 77 will now open from contact 78. Upon the opening of contact 77, the circuit through the motor will be broken and the latter will stop. The cams 50 and 51 are arranged to make one revolution in four seconds so that the circuits previously described as controlled by these cams are broken very shortly after the closing thereof. Thus the magnet 123 is energized only momentarily and the operation of the clocks 112 is not perceptibly checked.

Provision is made for testing the integrity of the circuits through the subscribers' clocks. To effect this a conductor 129 leads from conductor 118 at a point close to the circuit closer 59 and extends to a sleeve contact 130 of the test jack having the contact 121. A conductor 131 connects the conductor 122 with an automatic testing device (not shown). A plug 130' carrying a pair of conductors is connected to a testing device, (not shown), and is adapted for insertion in the test jack to bridge contacts 130 and 121. A pair of contacts 132 and 133 of a test switch are arranged to be moved apart by a key 134 to engage respective contacts 135 and 136. Contact 135 is connected by a conductor 137 with conductor 97 and thus to bell 98. A conductor 138 connects conductor 99 from the bell with contact 136. A conductor 139 connects conductor 96 with contact 132 and a conductor 140 connects conductor 111 with contact 133. Upon the key 134 being depressed current will flow from feed 75 through conductor 96, conductor 139, contact 132, contact 135, conductor 137, conductor 97, bell 98, conductor 99, conductor 138, contact 136, contact 133, conductor 140, conductor 111 and through magnet 95 to ground thus closing contact 94 on contact 93. The ringing of bell 98 thus gives evidence of the integrity of this circuit, and closes the relay circuit closers 116. Upon insertion of the plug 130' into the test jack, current will flow from bus bar 114, through uppermost conductor 115, armature 116 of the right hand relay, switchboard panel 117, conductor 118, conductor 129, ring contact 130 of the test jack, plug 130' and an ammeter connected thereto, test jack contact 121, conductor 122 to the clock magnets in the line, which thus indicates the integrity of the clock circuit.

Provision is also made for detecting variations between true time as received from the Naval Observatory and the time as given by the master clock 60. To this end the circuit closer 63 is arranged to close at fifty-seven minutes and fifty seconds, fifty-eight minutes and fifty seconds and fifty-nine minutes and fifty seconds before noon. A contact 141 of a test switch is arranged adjacent the contact 100 and is grounded at 142. A movable contact 143 is arranged adjacent the contact 100 in such position that a test switch key 144 will, when depressed move these contacts 100 and 143 apart and bring the contact 100 into engagement with contact 141. A contact 145 is arranged in the path of movement of contact 143 and a conductor 146 connects contact 145 and conductor 65. The key 144 is depressed shortly before the fifty-seven minutes and fifty seconds time above mentioned. At that time circuit closer 63 is closed and current will flow from battery 67, conductor 66, circuit closer 63, conductor 65, conductor 146, contact 145, contact 143, a conductor 147, conductor 72, magnet 71, conductor 70, magnet 69 and conductor 68 back to the battery. This effects closing of contacts 77 and 83 on contacts 78 and 84 respectively and starts the cycle of operations previously described. However, the opening of contact 100 from contact 101 and its closing on contact 141 provides a somewhat different circuit path since the magnet 123 is not energized but current flows from feed 75 through conductor 96, contact 53, contact 52, conductor 97, single stroke bell 98, conductor 99, contact 100, and contact 141 to ground 142. Due to the timing of the cycle as before described the cam 50 closes this circuit and rings the bell exactly two minutes before the hour as given by the master clock. This signal is compared with the Washington time signals as given by a bell or recorded on a chronograph. If any variation from Washington time is found to exist the knob 40 is turned in the proper direction to move the contacts 53 and 52 around the cam 50 and to correspondingly move the contacts 59 around the cam 56. A second test may be made in a similar manner at one minute before noon and any error still existing may then be corrected in a similar manner. Obviously the cam 51 will restore the parts to normal condition at two seconds after each test so that, at the noon hour the setting of the subscribers' clocks will be effected just as though no test had been made except that the setting cycle will occur at true Washington noon even if the master clock indicates some variation from noon. This variation from the master clock will of course be maintained for subsequent hourly settings until the master clock has been adjusted to conform to Washington time whereupon the knob 40 is reset.

Figure 12:
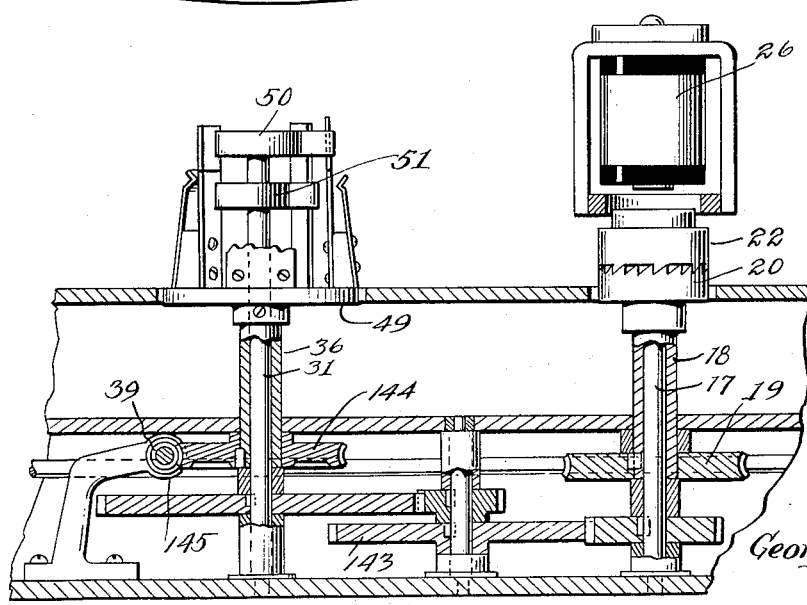
Figure 12 is a section on the line 12—12 of Figure 11.
Figure 11:
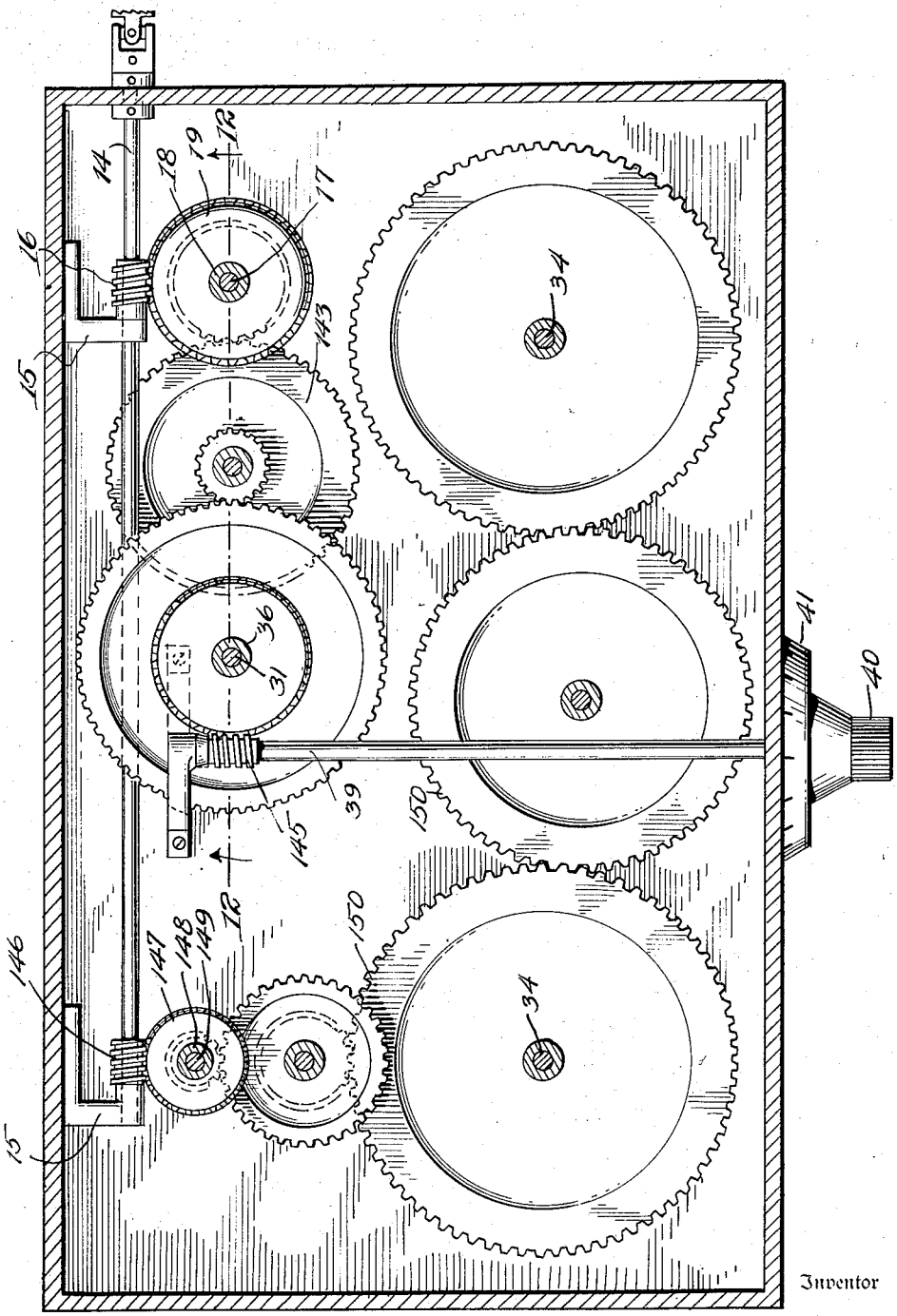
Figure 11 is a view similar to Figure 2 but showing an arrangement of gearing as used in a modified form of the invention.
Figure 13:
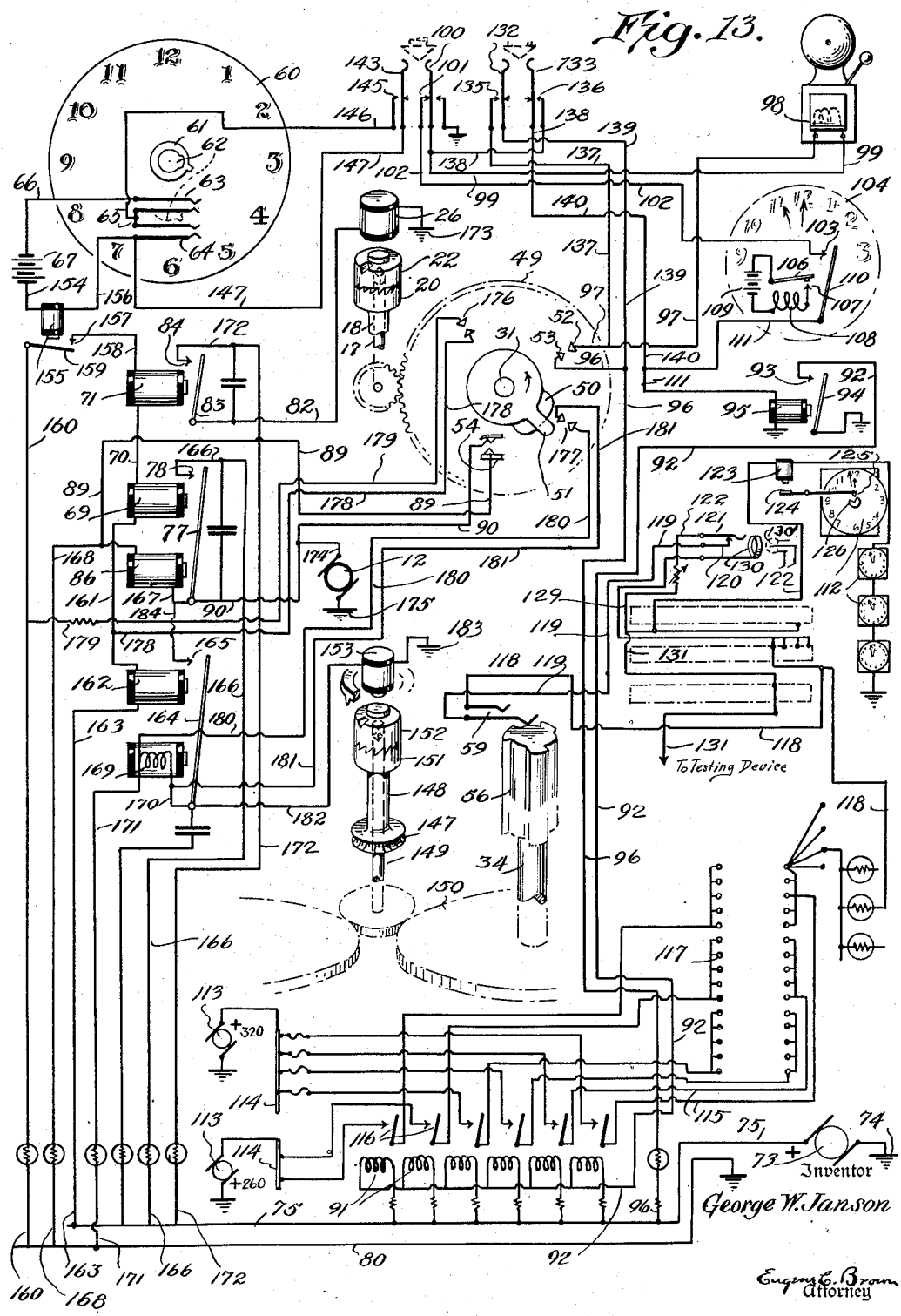
Figure 13 is a diagram of the circuits used in this form of the invention.

The form of the invention shown in Figures 11, 12 and 13 is similar in construction to the form just described. Also many of the circuit connections are identical with those of the first form. Accordingly the parts of this second form corresponding to those of the first form have received like reference characters and only those parts which differ will be specifically described.

The shaft 14 is used in this form but, in addition to the worm 16 is extended to carry this shaft well toward the left hand end of the casing 10. The worm 16 drives the sleeve 18 and shaft 17 in the manner previously described. Reduction gearing 143 connects the shaft 17 with the shaft 31. The sleeve 36 revolves on this shaft as before and carries the disk or platform which supports the contacts 52 and 53. However, a worm wheel 144 replaces the gear 37 and a worm 145 is carried on the shaft 39 to mesh with this worm wheel.

A worm 146 is fixed on the left hand end of the shaft 14 and meshes with a worm wheel 147 fixed on a sleeve 148 revolubly mounted on a shaft 149. A suitable reduction train 150 connects shaft 149 with the shafts 34 carrying the cams 56. A lower clutch member 151 is fixed on the sleeve 148 and an upper clutch member 152 is splined on the upper end of shaft 149 to coact with the member 151. An electro-magnet 153 is positioned above the clutch member 152 to unclutch the parts when energized. This part is thus a duplication of the clutch controlling shaft 17 and sleeve 18.

Referring to Figure 13 the master clock circuit closers are as before described and control a local relay circuit. A conductor 154 replaces the conductor 66 and leads from the battery 67 to one terminal of relay magnet 155, which has its other terminal connected by a conductor 156 with the circuit closer 64. A fixed relay contact 157 is connected by a conductor 158 with the magnet 71. An armature contact 159 of this relay is connected by a conductor 160 with the ground wire 80. A conductor 70 connects the magnet 71 and the magnet 69 as before. A conductor 161 connects the magnet 69 in series with one terminal of a relay magnet 162 and a conductor 163 connects the other terminal of this magnet 162 with the supply conductor 75. An armature or movable contact 164 is closed by the energization of magnet 162 to engage a fixed contact 165. A conductor 166 extends from the main supply conductor 75 to contact 78 and a conductor 167 connects the contact 77 with one terminal of the magnet 86. A conductor 168 connects the other terminal of this magnet 86 to ground line 80. A holding magnet 169 is provided for armature contact 164 and a conductor 170 connects said armature contact to one terminal of this magnet. A conductor 171 connects the other terminal of this magnet with the ground line 80. A conductor 172 connects the supply conductor 75 with contact 84. One terminal of magnet 26 is connected by conductor 82 as before, to contact 83, the other terminal of this magnet being grounded as at 173. A conductor 174 connects the conductor 90 with the motor 12 and this motor is grounded at 175. A circuit closer 176 is mounted on the disk or platform 49 in circumferentially spaced relation to the contacts 52 and 53 and is, like them, actuated by the cam 50. A second circuit closer 177 is similarly mounted and is also actuated by cam 50. It is here to be noted that the adjustment of the contacts 52 and 53 in synchronizing the closing of these contacts with Washington time, also similarly adjusts the circuit closers 176 and 177. A conductor 178 connects circuit closer 176 with conductor 161 and a conductor 179 connects circuit closer 176 with conductor 160 and thus to the ground. A conductor 180 connects circuit closer 177 with one side of magnet 169 and a conductor 181 connects said circuit closer to conductor 170. A conductor 181 connects contact 164 with one terminal of magnet 153 and the other terminal of this magnet is grounded at 183.

In this form of the invention the first set of contacts in the master clock close at twenty seconds to the hour and the second set at ten seconds to the hour as before. As the second set closes, current will flow from battery 67 through conductor 66, circuit closer 63, conductor 65, circuit closer 64, conductor 156, magnet 155 and conductor 154 back to the battery. This will cause closing of contact 159 on contact 157 and current will flow from supply 75 through conductor 163, magnet 162, conductor 161, magnet 69, conductor 70, magnet 71, conductor 158, contact 157, contact 159 and conductor 160 to ground wire 80. This effects the closing of contact 83 in contact 84, of contact 77 on contact 78 and of contact 164 on contact 165. Current will now flow from supply conductor 75 through conductor 172, contact 84, contact 83, conductor 82 and magnet 26 to ground 173 thus energizing the magnet 26 and opening the clutch controlled thereby as before. Also current will flow from feed 75 through conductor 166, contact 78, contact 77, conductor 90, conductor 174 and motor 12 to ground 175. From contact 77 current will flow through conductor 167, holding magnet 86 and conductor 168 to ground wire 80. A conductor 184 connects contact 77 with contact 165 so that current will also flow from contact 77 through conductor 184, contact 165, contact 164, conductor 182 and magnet 153 to ground 183 thus opening the clutch member 152 from 151. The two clutches controlled by magnets 26 and 153 being opened, the motor 12 will run idle to acquire its rated speed. Also current will flow from contact 164 through conductor 170, holding magnet 169 and conductor 171 to ground wire 80. As in the first form, the circuit closer 64 will open at two seconds to the hour, whereupon the circuit through the relay magnet 155 will open, thereby deenergizing magnets 71, 86 and 162 with consequent opening of the circuit through magnet 26 so that the clutch controlled thereby will engage and the cams 50 and 51 will start to revolve. The holding magnets 86 and 169 are still energized and continue to maintain circuits through motor 12 and magnet 153. The circuit closer 177 is now closed by cam 50 whereupon the holding magnet 169 is short-circuited through conductors 180 and 181 and clutch magnet 153 is deenergized, allowing clutch member 152 to drop, so that shafts 34 are now driven from the motor. Next the contacts 53 and 52 are closed and the synchronizing impulse is sent out as in the first instance. The circuits for this impulse are identical with those described in the first form and will not again be traced. Next, the circuit closer 176 is closed. Now current will flow from feed 75 through conductor 163, magnet 162, conductor 161, conductor 178, circuit closer 176, conductor 179 and conductor 160. This will re-establish the circuit through magnet 153 and unclutch the clutch controlled thereby, thus stopping movement of the cams 56. Finally the circuit closer 54 is closed and this short-circuits the magnet 86 as in the first form and the motor stops.

It is to be understood that the individual clock circuits may also be used as messenger call circuits. This utilization of conductors for two services is possible because of the wide difference between the operating current required for correcting subscribers' clocks and that required for operating the messenger equipment by means of which calls from patrons are recorded. The current required for the messenger service is about one-fifth of that usually provided for the operation of the resetting mechanism of clocks and is not of sufficient magnitude to affect the clock service. This messenger current is continuous except when calls are being received from patrons' call boxes.

Figure 4:
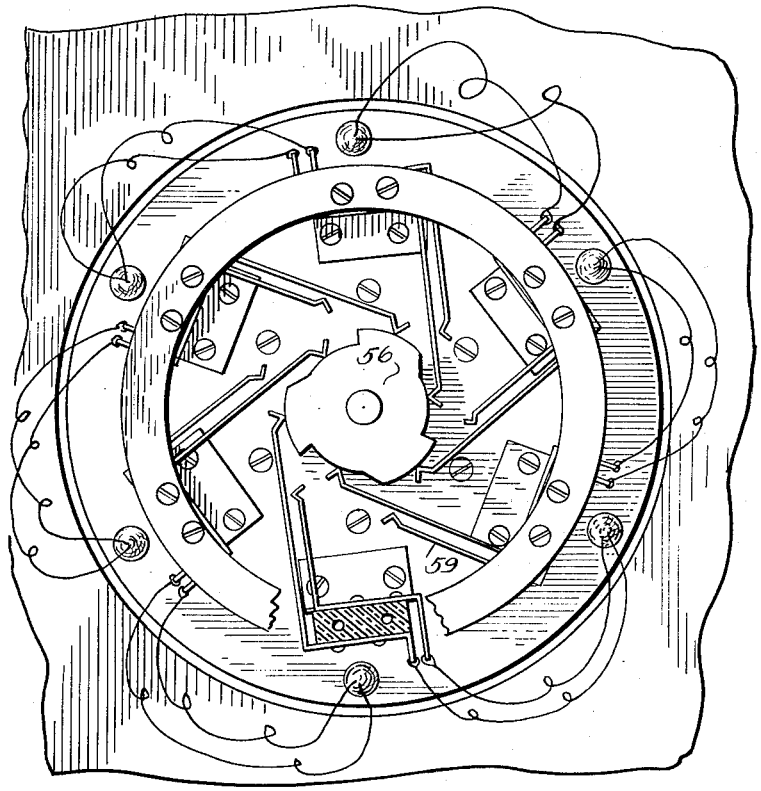
Figure 4 is a plan view on an enlarged scale and partly in section, showing the subscriber's clock circuit closers used herewith.

Each combined circuit serves a number of call boxes and in addition, a number of clocks each of which is provided with the electro-magnet to control its resetting device. The call boxes and the electro-magnets are connected in series on the line wire. A number of these wires or circuits are terminated at a central office where they are normally connected to the apparatus by means of which signals from the call boxes are received. In order that the call circuit receiving apparatus at the central office may be momentarily disconnected during the transmission of the synchronizing impulse for the clocks, I modify the synchronizing impulse device for the clock circuit closers shown in Fig. 4, by adding to each pair of contacts another contact spring which is connected to the call circuit receiving apparatus, as shown in Fig. 4a. It will be evident that at the instant the cam member 56 rotates into position to close the clock circuits, the intermediate spring contact arms which engage the cam faces will open the circuits to the call receiving apparatus at each of the contacts. The sources of current connected to the combined circuits for transmitting the clock synchronizing impulse are of considerably higher voltage than the normal value required for the reception of call box signals to ensure the operation of the electro-magnets which set the hands of the clocks on the hour to correspond with those of the master clock.

I claim:

1. In a clock synchronizing apparatus, a master clock, a subscriber's clock having an electromagnetic clock setting device including a synchronizing circuit and a normally open circuit closer therefor, a revolving element arranged to engage and close said circuit closer, a normally inactive motor having a motor circuit and a normally open motor circuit closer, a driving mechanism connecting said element and motor and including a normally closed clutch, an electromagnet arranged to open the clutch when energized and having a circuit including a normally open magnet circuit closer, and electro-magnetic means controlled by the master clock for closing the motor and magnet circuit closers and for releasing the magnet circuit closer to open prior to the opening of the motor circuit closer.

2. In a clock synchronizing apparatus, a master clock, a subscriber's clock having an electromagnetic clock setting device including a synchronizing circuit and a normally open circuit closer therefor, a revolving element arranged to engage and close said circuit closer, a normally inactive motor having a motor circuit and a normally open motor circuit closer, a driving mechanism connecting said element and motor and including a normally closed clutch, an electro-magnet arranged to open the clutch when energized and having a circuit including a normally open magnet circuit closer, magnets for closing said magnet circuit closer and said motor circuit closer respectively, a battery circuit extending through said magnets and including a normally open circuit closer, means controlled by the master clock for temporarily closing the battery circuit closer, a holding magnet for the motor circuit closer having a circuit closed upon closing of the motor circuit closer, and means for short circuiting the holding magnet circuit.

3. A clock synchronizing apparatus, as set forth in claim 2, and a testing circuit having means to close said relay circuit independent of said motor actuated means to effect closing of the synchronizing circuit at the first mentioned circuit closer.

4. In a clock synchronizing apparatus, a master clock, a subscriber's clock having an electromagnetic clock setting device, a synchronizing circuit and a normally open circuit closer therefor, a revolving element arranged to engage and close said circuit closer, said circuit closer being adjustable along a path concentric to said revolving element, a motor, an operative connection between said motor and revolving element including a clutch, and electro-magnetic means governed by the master clock for controlling the operation of said motor and clutch.

5. In a clock synchronizing apparatus, a master clock, a subscriber's clock having an electromagnetic clock setting device including a synchronizing circuit and a normally open circuit closer therefor, a revolving element arranged to engage and close said circuit closer, said circuit closer being movable along a path concentric to said revolving element, a normally open relay circuit arranged to effect preparatory closing of the synchronizing circuit and including a relay circuit closer, a second revolving element arranged to engage and close said relay circuit closer, said relay circuit closer being movable along a path concentric to said second revolving element, means to move said circuit closers along said paths simultaneously in equal arcs, a motor, an operative connection between said motor and revolving elements including a clutch, and electro-magnetic means governed by the master clock for controlling the operation of said motor and clutch.

6. In a clock synchronizing apparatus, a master clock, a normally open subscriber's clock synchronizing circuit including a plurality of circuit closers and a source of current, a relay for causing the operation of one of said circuit closers, a normally open relay circuit, a motor controlled from the master clock, means controlled by the motor for closing said relay circuit, and other means driven by the motor for closing the synchronizing circuit at a second one of said circuit closers.

GEORGE W. JANSON.